United States Patent Office 3,536,296
Patented Oct. 27, 1970

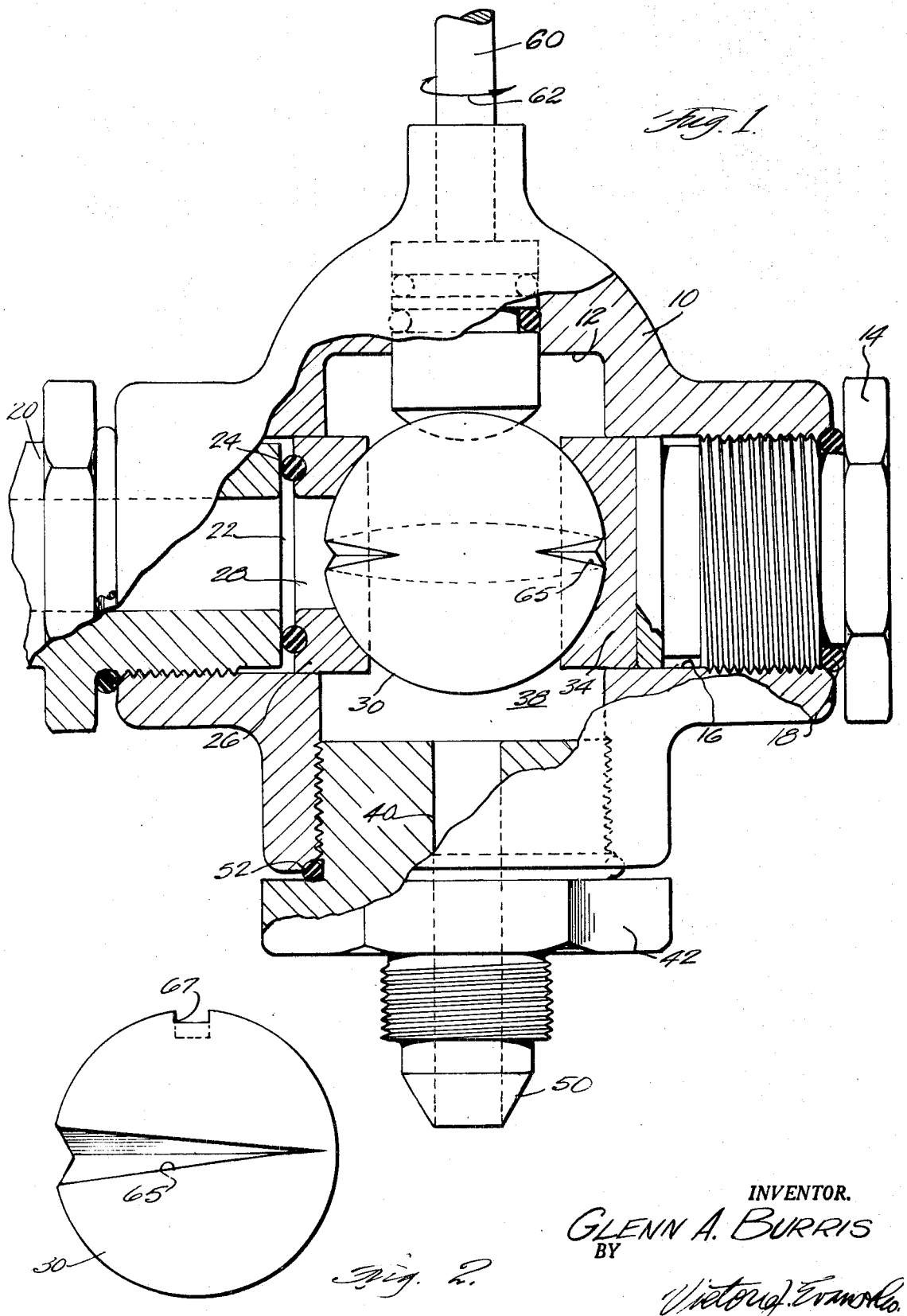

3,536,296
PRECISION FLUID CONTROL BALL VALVE
Glenn A. Burris, Mountain View, Calif., assignor of twenty percent each to Joseph A. Lares, Redwood City, Calif., and to Albert J. Lares, Woodside, Calif.
Filed Sept. 12, 1968, Ser. No. 759,416
Int. Cl. F16k 5/12
U.S. Cl. 251—208       1 Claim

ABSTRACT OF THE DISCLOSURE

A precision fluid control ball valve in which there is a ball having a tapered groove disposed around the ball of said valve of a tapering dimension. The tapered groove may be described as a tapered scratch or cut formed in the surface of the ball for allowing precise amounts of fluid flow to be regulated.

---

The present invention relates to an improved precision fluid control ball valve, and more particularly relates to a tapered groove or scratch on a ball for a valve so that there is precision fluid control provided by the use of the groove on the rotatable ball when housed in a suitable valve chamber.

A further object of the present invention is to provide a ball with a groove or grooves cut thereon, formed by any means around the surface of the ball in such a way as to allow a controlled metering of fluid by the rotation of the ball between the two opposing seals.

Another object of the invention is to provide grooves of any depth, configuration or number disposed around a rotatable ball surface so as to allow an adjustment of the flow of fluid by the rotation of said ball.

A further object of the invention is to provide rotation of said grooved ball to be achieved by means of a rotatable stem with any sufficient means of seal with the valve body, and any sufficient means of connection with the ball.

A further object and advantage of the invention is that it relates to the principle of a groove or grooves disposed around a ball in ony ball valve, and is particularly adaptable for the application of a ball to meter fluids regardless of how it is applied, and also provide means to control the rotation of the ball.

FIG. 1 shows a partially broken away cross-sectional front elevation view of the precision fluid control ball valve according to the preferred embodiment and best mode of the invention; and FIG. 2 is a side view of the ball with the groove disposed therein and means for connecting or being rotated by the valve stem.

Referring now to the drawings, there is shown a valve body 10 having a valve chamber 12, a plug 14 for closing off an opening 16 of said chamber, in which there is an O-ring 18 disposed between the plug 14 and the lip of the opening 16.

There is further provided a threaded tube 20 shown broken away at the left end thereof and having its right end terminating at edge 22. Mating with the edge 22 is an O-ring 24 disposed to engage a bearing 26 having an aperture 28 passing therethrough. The distal side of the bearing 26 opposite the O-ring 24 mates with an outer curved surface of a ball 30 of the ball valve 10. Thus the mating surface between the bearing 26 and the ball 30 mutually engage each other, as is shown, and form a tight seal.

There is also provided a bearing cup 34 in which there is a mating surface engaging also the surface of the ball 30. Below the ball, there is an extension of the valve chamber 12, shown as portion chamber 38, which leads through a conduit 40 of a coupling 42, and thus through a threaded fitting 50.

There is disposed between the coupling 42 and the housing 10, an O-ring 52 for providing a tight seal.

Disposed on the ball, there is a tapering or wedge-formed slot or groove 65 disposed on said ball for providing leakage or controlled and precision fluid flow from said valve from the conduit 40 to the outlet 50. The regulated amount of precision flow is caused by the relative position of the ball 30 and the amount of fluid that may pass through the tapered wedged groove as it traverses the sealed portion of the mutually engaging surface of the bearing 26 with the ball 30.

The ball may be disposed to turn about a vertical axis as it is engaged with a stem 60 which rotates in the direction shown by the arrow 62. The lower end of the stem may have a mating coupling that engages with the mating portion 67 of the ball 30. In this way, the stem engages the mating portion 67 so that there is a male-female connection, and this forms a follower-type coupling so that the ball follows the rotation of the stem 60.

While the preferred embodiment of this invention has been illustrated and described, it will be understood by those skilled in the art that modifications and changes may be resorted to without departing from the spirit and scope of the invention.

What is claimed is:

1. A precision fluid control ball valve comprising a valve housing, an inlet port, a seal bearing for the inlet port, a ball disposed within a valve chamber of said valve housing, a stem rotatably mounted in said valve housing and connected to the ball, a cup bearing disposed to support the ball from one side and a mating bearing surface engaging the other side of said ball and in communication with the inlet port, an outlet port disposed from said valve chamber, and a tapering wedge formed groove disposed about the surface of said ball in a horizontal plane passing through the axis of said inlet port, said wedge increasing in width and depth in a direction toward the center thereof from each end thereof so that fluid flow through said inlet and outlet ports may be gradually increased from no flow at all eliminating an undesirable sudden increase of fluid flow when the groove initially traverses a portion of the mating surface between said seal bearing and the ball, said groove allowing fluid to increasingly flow past said inlet port and decreasingly flow past said inlet port immediately thereafter as said stem is rotated in one direction only, clockwise and counterclockwise alternatively.

References Cited

UNITED STATES PATENTS

| 2,762,601 | 9/1956 | Clade | 251—317 XR |
| 2,934,311 | 4/1960 | Sjoholm | 251—209 |
| 3,191,906 | 6/1965 | Zeigler et al. | 251—208 |
| 3,305,211 | 2/1967 | Phillips | 251—309 |

HENRY T. KLINKSIEK, Primary Examiner